Jan. 20, 1959 E. P. ORMSBY 2,869,428
LUBRICANT DRAIN FOR MACHINE TOOL LUBRICATING SYSTEM
Filed Sept. 4, 1956 2 Sheets-Sheet 1
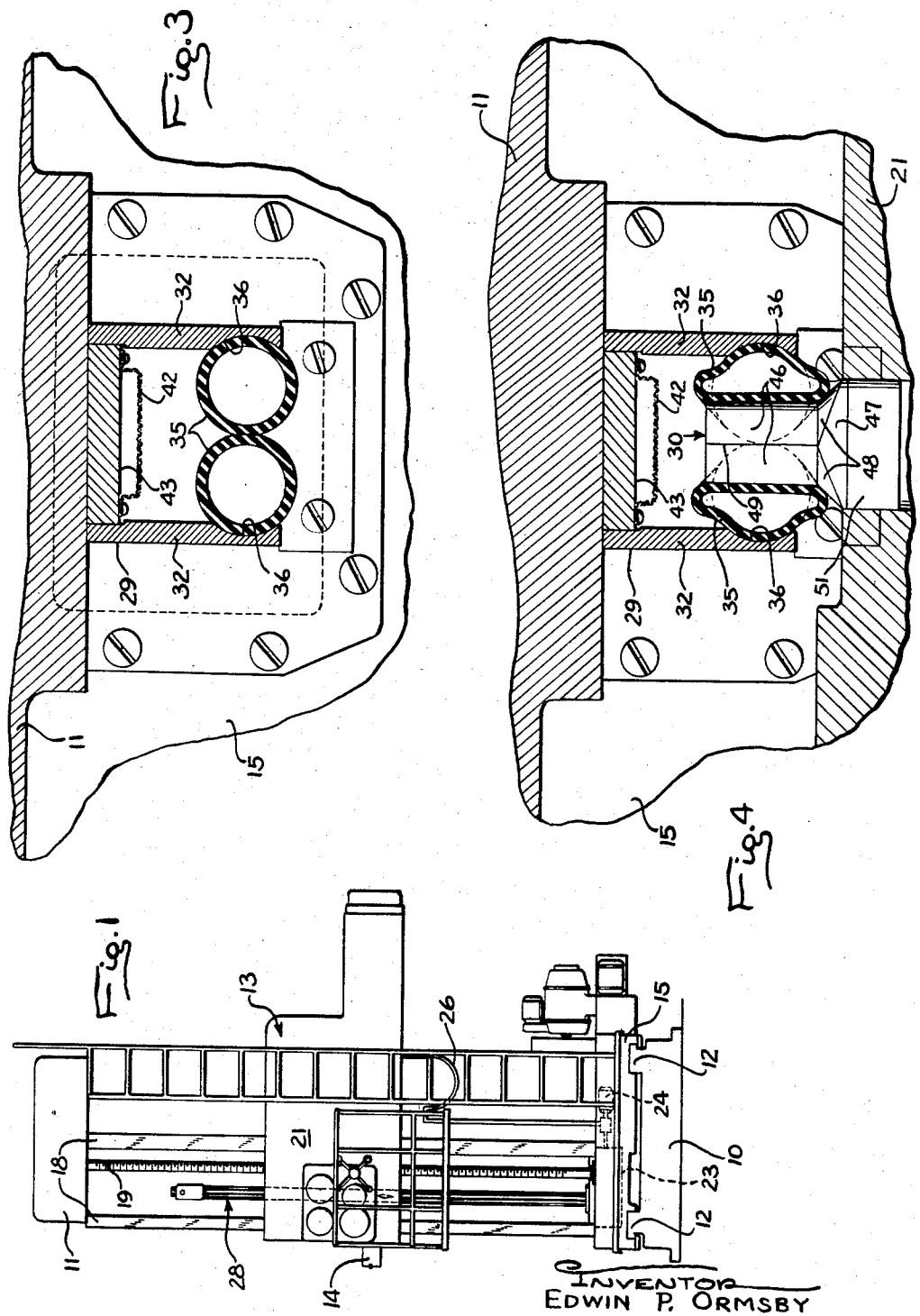
INVENTOR
EDWIN P. ORMSBY
by: Gordon, Pitzner, Hubbard & Wolfe
ATTORNEY Jan. 20, 1959     E. P. ORMSBY     2,869,428
LUBRICANT DRAIN FOR MACHINE TOOL LUBRICATING SYSTEM
Filed Sept. 4, 1956     2 Sheets-Sheet 2
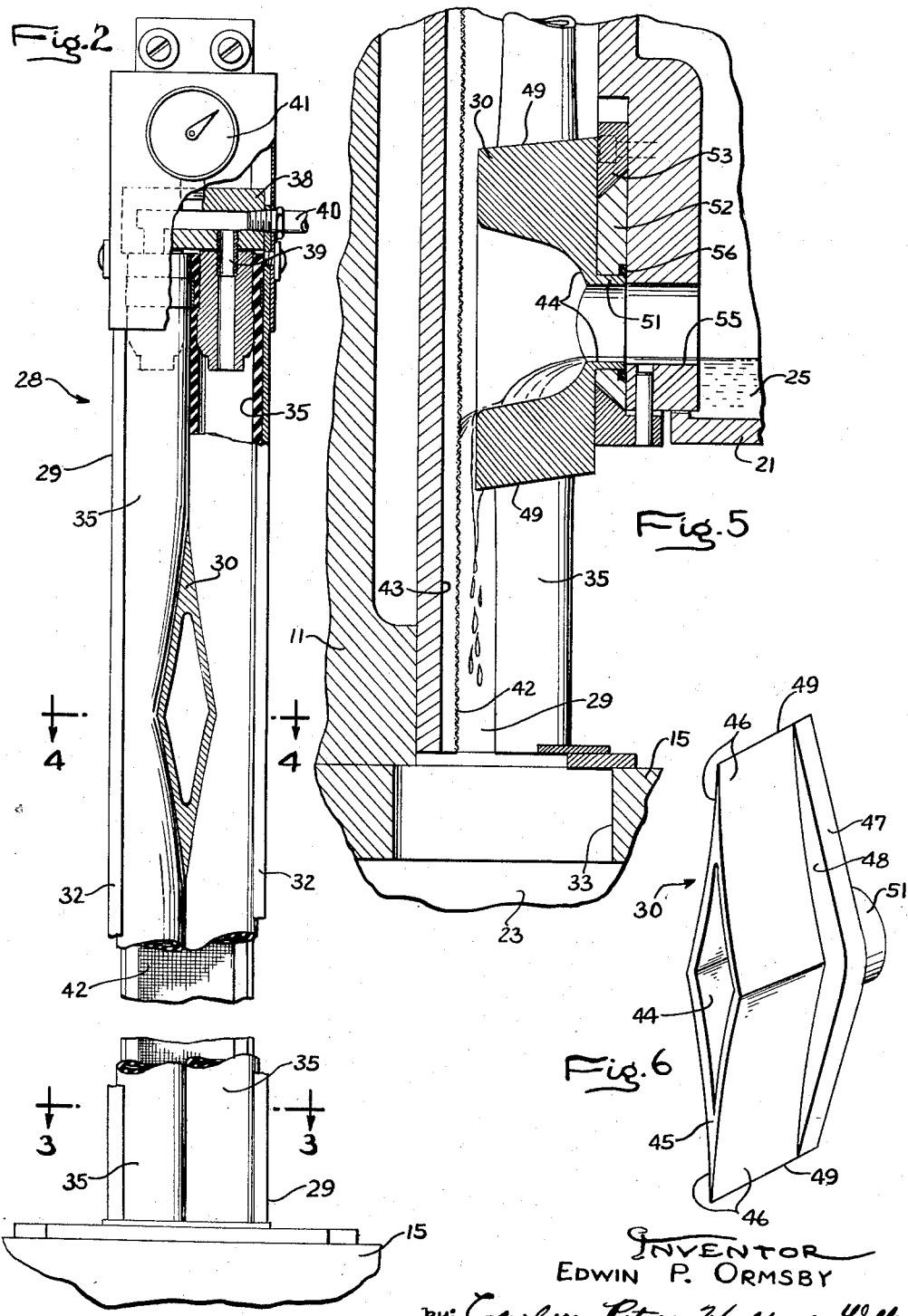
INVENTOR
EDWIN P. ORMSBY United States Patent Office 2,869,428
Patented Jan. 20, 1959

2,869,428

LUBRICANT DRAIN FOR MACHINE TOOL LUBRICATING SYSTEM

Edwin Percy Ormsby, Lamartine, Wis., assignor to Giddings & Lewis Machine Tool Company, Fond du Lac, Wis., a corporation of Wisconsin Application September 4, 1956, Serial No. 607,951

10 Claims. (Cl. 90—11)

This invention relates to lubricating systems for machine tools or the like and it is particularly concerned with a lubricant drain for use in such systems.

To adapt machine tools of the general character herein referred to for precision machining, the component parts thereof are constructed and assembled so that the tool spindle is very accurately located with respect to certain portions of the machine and thus to the workpiece being machined. In present day high-speed machining practices, a relatively great amount of heat is generated in the high-speed headstock and the transfer of heat to the way structure on which the headstock is mounted proceeds quite rapidly, particularly when the headstock is clamped to the ways. Even with the sturdiest and most rigid construction possible, such heating of the way structure results in the warping or bending of the ways and consequently, considerable difficulty is experienced in maintaining accurate spindle alinement. Such temperature changes may also interfere with the precision operation of the machine tool.

With the foregoing in mind, lubricating systems have been designed to effectively dissipate the heat generated in the headstock. This is accomplished by a system of circulating lubricant which serves the dual purpose of lubricating the headstock mechanism and acting as a coolant for removing heat from the headstock and dissipating it in another portion of the machine. In general, lubricant is circulated by means of a lubricant pump from a reservoir in the base of the machine tool up through the headstock and back into the reservoir. Such a lubricating system is shown, for example, in application Serial No. 266,929, filed January 17, 1952, now U. S. Patent No. 2,762,269, to which reference should be made for a more detailed description of such a lubricating system.

Machine tools of the above general character are commonly designed for machining comparatively large workpieces. Consequently, the spindle headstock of the machine tool must be supported at or be capable of adjustment to a substantial distance from the machine bed and over a wide range. Support for the headstock is usually provided by a way structure along which the headstock may be shifted to selected positions of adjustment required by different jobs, the headstock being rigidly clamped to the way structure during machining operations.

It is one object of the present invention to provide, for use in a lubricating system of the foregoing type, an improved lubricant drain for discharging lubricant from the headstock of the machine tool and preventing the loss of such lubricant by leakage and splashing.

Another object of the present invention is to provide a novel lubricant drain having the foregoing characteristics, which is of the gravity type and which does not limit the travel of the headstock on the machine tool column.

A further object of the present invention is to provide in a gravity type lubricant drain of the above type an improved, flexible, fluid-tight seal which is adaptable for use with any length headstock travel and which successfully prevents the leakage of lubricant as it flows from the movable element to the reservoir.

Other objects and advantages of the invention will become apparent as the following description proceeds taken in connection with the accompanying drawings in which:

Figure 1 is an elevation view of a machine tool equipped with a lubricating system having a drain device illustrative of the present invention incorporated therein.

Fig. 2 is an enlarged front elevation view, partly in section, of the drain device shown in Fig. 1.

Fig. 3 is an enlarged sectional view taken substantially in the plane of line 3—3 of Fig. 2.

Fig. 4 is an enlarged plan view, partly in section, taken substantially in the plane of line 4—4 of Fig. 2.

Fig. 5 is an enlarged vertical section view of a portion of the novel drain device.

Fig. 6 is an isometric drawing of a nozzle useful with the drain device shown in Fig. 1.

While the invention is susceptible of various modifications and alternative constructions, a certain illustrative embodiment has been shown in the drawings and will be described below in detail. It is to be understood, however, that there is no intention to limit the invention to the specific form disclosed but, on the contrary, the intention is to cover all modifications, alternative constructions and equivalents falling within the spirit and scope of the invention as expressed in the appended claims.

Referring to Fig. 1 of the drawings, the machine there shown to illustrate the invention is commonly known as a horizontal boring, milling and drilling machine. It comprises generally an elongated, horizontal bed 10 of massive construction and carrying a headstock column 11 on ways 12 for translational movement. The headstock column 11 supports a vertically adjustable headstock 13 equipped with a horizontally disposed, axially slidable tool spindle 14.

The column 11 is in the form of an upright, hollow casting, bolted or otherwise rigidly secured to the top of a saddle or base 15 slidably mounted on the ways 12. The column is provided at its front face with spaced, parallel vertical ways 18 for supporting and guiding the headstock 13 in its vertical adjustments. Such adjustments are effected through the medium of a feed screw 19 rotatably anchored at its upper end on the column 11 and coacting with a suitable nut (not shown) provided in the headstock 13.

The headstock 13 may be of any suitable character and of the type generally provided on machine tools of the foregoing type. Briefly, it comprises a generally rectangular housing 21 which includes suitable gearing for rotating and axially translating the tool spindle 14. The present invention is not concerned with details of the gearing but with the problem of supplying lubricant such as oil to the headstock for the lubrication of that gearing and other movable elements in or associated with the headstock and more particularly with the discharging of the excess oil which collects in the bottom of the headstock housing 21 (Fig. 5). This oil is conducted, by means to be described, to a main oil reservoir 23 located in the base 15 of the machine.

The lubricating system used in the machine tool of the type shown in Fig. 1 includes a pump 24 in the main reservoir arranged to discharge the oil under pressure through a flexible conduit 26 projecting from the top of the base 1. The oil is carried through this flexible conduit to a suitable fitting (not shown) on the headstock housing 21 through which it is discharged. The oil passes over the gears and other mechanisms in the headstock and collects in a sub-reservoir or pool 25 in the bottom thereof. Used oil is returned to the main reservoir 23 through a gravity drain illustrative of the present invention.

By locating the main reservoir of oil in the machine base 15, a much greater volume of oil can be accommodated. Moreover, the heat removed from the headstock by the oil is effectively dissipated in the large reservoir of oil in the base and in the heavy structure forming the machine bed. This cools the oil which, when returned to the headstock, acts as a coolant to prevent the adverse effects of the heat generated in the headstock on the alinement of the spindle or other working parts of the machine.

For the purpose of conducting the lubricant or oil from the headstock reservoir 25 downwardly into the main reservoir 23 in the base 15, a gravity drain device 28 embodying the present invention is provided. This device is formed primarily of two parts, a gravity drain tube 29 mounted on a vertical face of the column and a nozzle 30 leading from the headstock reservoir and projecting into the drain tube 29 in both sliding and sealing engagement therewith.

Referring to Fig. 3, there is shown a drain tube 29 constructed in accordance with the present invention and adapted to conduct by gravity the oil from the headstock pool 25 into the main reservoir 23. This illustrative drain tube comprises a channel-like member formed of a pair of parallel, outwardly projecting walls 32 extending vertically along the front face of the column and having its lower end opening through a hole 33 into the oil reservoir 23 in the lower portion of the column base 15 of the machine tool. The nozzle 30 on the headstock 13 is received intermediate the two sidewalls 32 of the channel-like member for discharging oil thereinto.

Provision is made for a sealing and sliding engagement between the nozzle and the drain tube as the headstock is adjusted vertically to prevent splashing or leakage as the oil runs down the channel and into the main reservoir 23. This is accomplished by a slit curtain-like member comprising a pair of cylindrical rods or tubes 35 extending longitudinally between the channel forming walls 32 and diametrically abutting each other and the adjacent walls (Fig. 3).

In order to prevent leakage between the sealing members and the channel walls, the sealing members are made so that the sum of their outer diameters is slightly greater than the inner distance between the channel sidewalls 32 and of a stiff material so that they abut together and engage the walls with sufficient tightness to prevent leakage. For the same purpose, the sealing members 35 are also desirably sealed in recesses 36 in the adjacent walls 32 by a suitable adhesive or weld. The sealing members can be made of any suitable material which is both oil and heat resistant, such as neoprene rubber or other similar plastic material, for example.

The abutting engagement between the sealing members is desirably increased by forming them of tubes which are sealed at their ends and internally pressurized. One suitable means for pressurizing the sealing tubes is shown in Fig. 2. This means comprises a manifold 38 mounted between the channel walls 32 and adjacent the upper end of the drain tube. The mainfold is connected by suitable pressure-tight fittings 39 to the upper ends of the sealing tubes 35. An inlet valve 40 is provided on the manifold 38 through which compressed air from a hand pump may be applied to pressurize the tubes 35. To determine the air pressure within the sealing tubes 35, a pressure gage 41 is desirably provided on the manifold. For example, the tubes shown in Fig. 2 are desirably pressured to 5 p. s. i.

In order to reduce the splashing action of the oil when it is discharged from the nozzle 30 into the drain tube 29, a splash screen 42 is secured to the inner or web surface 43 of the channel (Fig. 3). The oil, when discharged into the drain tube, tends to run down the drain tube along the splash screen 42 and undesirable agitation and splashing of the oil, particularly when it is discharged into the upper end of the drain tube, is prevented. For this purpose any suitable screen, such as that shown in Fig. 2, or other baffle means may be employed.

For the purpose of discharging lubricant from the sub-reservoir pool 25 in the headstock housing into the drain tube 29, the nozzle 30 is mounted, as shown in Fig. 5, on the rear face of the headstock housing 21 and communicates with both the internal reservoir 25 of the headstock and the drain tube 29. Lubricant can thus flow freely from the reservoir 25 through a passage 44 in the nozzle, into the drain tube, and thence into the main reservoir 23 in the base of the machine.

The nozzle is formed of a streamlined shape so that the flexible sealing members 35 of the drain tube 29 will conform to its contour and form a seal around it. To this end the discharge or spout portion 45 of the nozzle (Fig. 6) is a hollow prism of generally elongated diamond or double-wedged shape in cross section (Fig. 2) formed by gently tapering outer surfaces 46. The spout is thus adapted to project into the drain tube between the flexible sealing members, which members conform generally to its outer contour. Sealing engagement between the spout and the flexible sealing members on the drain tube is enhanced by a flange 47 surrounding the spout and having an outwardly sloping shoulder 48 for engaging the outer surfaces of the sealing members 35. As the sealing members, such as the pressurized tubes 35, are spread apart by the wedge shape of the spout, they sealingly engage the surfaces 46 and 48 of the spout and the flange shoulder respectively, thereby affording a tight but sliding seal between the nozzle 30 and the drain tube 29.

Movement of the nozzle in the slit between the sealing members is facilitated by making the upper and lower edges 49 of the spout smooth and sharp. In addition, the surfaces 46 and 48 of the spout 45 and the flange shoulder 47, respectively, are smooth to afford a free, sliding engagement with the sealing members. As the nozzle moves with the headstock 13, the sharp upper or lower edge 49 of the diamond or double-wedged shape spout 45 and the smooth surfaces 46 thereof force the sealing members 35 apart by a wedging action. Because the sealing members tend to conform to the contour of the spout and the tapered shoulder, a seal between the nozzle and the drain tube is thus maintained both during movement of the headstock and the nozzle and when the headstock is stationary at any selected adjustment on the column.

The nozzle is mounted on the headstock, as shown in Fig. 5, by a sleeve-like projection 51 extending from the flange and defining a portion of the lubricant discharge passage 44. Surrounding the projecting sleeve is a dovetail flange 52 which is secured to the headstock by a suitable clamping flange 53. The headstock is provided with a port 55 communicating with the interior passage 44 of the sleeve and an O-ring seal 56 surrounds the sleeve and the headstock port to prevent the escape of lubricant between the headstock housing 21 and the nozzle 30. So that oil flows towards and drips into the drain tube, the edges 49 of the nozzle slope downwardly and away from the headstock.

It will be apparent from the foregoing that the present invention provides a novel, gravity drain device for machine tools having movable headstocks or the like enclosing gearing and similar elements through which a lubricant-coolant is passed. With the drain device provided by the present invention, the main lubricant reservoir may be located in the base of the machine and may be dimensioned to accommodate a relatively large volume of oil. The drain device described herein does not limit the vertical adjustment range of the headstock but can be made as long or as short as desired, and the pressurizing means for the drain tube seal affords an effective sealing action throughout the length of the drain tube.

By using the foregoing improved nozzle construction, a fluid-tight sliding and sealing engagement between the headstock and the drain tube is provided ensuring a continuous communication between the headstock and the main lubricant reservoir without the danger of leakage or contamination of the lubricant being circulated.

I claim as my invention:

1. A lubricant-coolant fluid drain device for use on a machine tool having a horizontally disposed base, an upright column on the base, a spindle headstock supported on the column for vertical adjustment, and a fluid circulating system including a fluid reservoir located in the base and a pump for continuously pumping fluid from the reservoir into the headstock, said fluid drain device comprising, in combination, an outwardly opening channel extending the length of the column and having its lower end opening into the reservoir in the base, means yieldably sealing the open side of said channel to prevent the escape of fluid therefrom, and a nozzle extending outwardly from said headstock and into sliding and sealing engagement with said yieldable sealing means on said channel for conducting fluid out of the headstock and into said channel at all vertical adjustments of the headstock on the column whereby the fluid flows from the headstock into the reservoir without leakage.

2. A lubricant-coolant fluid drain device for use on a machine tool having a base, a headstock supported on said base for movement relative thereto and a fluid circulating system including a fluid reservoir located in the base and a pump for continuously pumping the fluid from the reservoir into the headstock, said fluid drain device comprising, in combination, a drain tube extending along the base in the direction of movement of the headstock and opening into communication with the reservoir in the base, said drain tube comprising an outwardly opening channel and means yieldably sealing the open side of said channel to prevent the escape of fluid therefrom; and a nozzle extending outwardly from said headstock and into slidable sealing engagement with said yieldable sealing means for conducting the fluid out of the headstock and into said drain tube at all adjustments of the headstock on the base, whereby the fluid flows from the headstock through said drain tube and into the reservoir without leakage.

3. A lubricant-coolant fluid drain device for use on a machine tool having a base, a headstock supported on said base for movement relative thereto and a fluid circulating system including a fluid reservoir located in the base and a pump for continuously pumping the fluid from the reservoir into the headstock, said fluid drain device comprising, in combination, a drain tube extending along the base in the direction of movement of the headstock and opening into communication with the reservoir in the base, said drain tube comprising an outwardly opening channel and means yieldably sealing the open side of said channel to prevent the escape of fluid therefrom, and a streamlined nozzle extending outwardly from said headstock and into slidable sealing engagement with said yieldable sealing means for conducting the fluid out of the headstock and into said drain tube at all adjustments of the headstock on the base, said nozzle being substantally diamond-shaped in cross section and having peripheral shoulder surfaces for sealingly engaging said sealing means, whereby the fluid flows from the headstock into the reservoir without leakage of fluid between the nozzle and the drain tube.

4. A lubricant-coolant fluid drain device for use on a machine tool having a horizontally disposed base, an upright column on the base, a spindle headstock supported on the column for vertical adjustment and a fluid circulating system including a fluid reservoir located in the base, and a pump for continuously pumping the fluid from the reservoir into the headstock, said fluid drain device comprising, in combination, an outwardly opening channel extending the length of the column and having its lower end opening into the reservoir in the base, a pair of resilient tubes extending along the open side of said channel, said tubes sealingly abutting each other and the channel sidewalls for preventing the escape of fluid from within the drain tube thus formed between the channel and the tubes, and a nozzle extending outwardly from said headstock and into sliding and sealing engagement between said tubes for conducting fluid out of the headstock and into said drain tube at all vertical adjustments of the headstock on the column whereby the fluid continuously flows from the headstock into the reservoir without leakage.

5. A lubricant-coolant fluid drain device for use on a machine tool having a horizontally disposed base, an upright column on the base, a spindle headstock supported on the column for vertical adjustment, and a fluid circulating system including a fluid reservoir located in the base, and a pump for continuously pumping the fluid from the reservoir into the headstock, said fluid drain device comprising, in combination, an outwardly opening channel extending the length of the column and having its lower end opening into the reservoir in the base, a pair of tubes extending along the open side of said channel, said tubes sealingly abutting each other and the channel sidewalls for preventing the escape of fluid from within the drain tube thus formed between the channel and the tubes, and a streamlined downwardly inclined nozzle extending outwardly from said headstock and into sliding and sealing engagement between said tubes for conducting fluid out of the headstock and into said drain tube at all vertical adjustments of the headstock on the column, said nozzle being diamond-shaped in cross section and having peripheral shoulder surfaces for sealingly engaging said tubes, whereby the fluid flows from the headstock into the reservoir without leakage thereof from the drain device.

6. A lubricant-coolant fluid drain device for use on a machine tool having a horizontally disposed base, an upright column on the base, a spindle headstock supported on the column for vertical adjustment, and a fluid circulating system including a fluid reservoir located in the base, and a pump for continuously pumping the fluid from the reservoir into the headstock, said fluid drain device comprising, in combination, an outwardly opening channel extending the length of the column and having its lower end opening into the reservoir in the base, a pair of pressurized resilient tubes extending along the open side of said channel, said pressurized tubes sealingly abutting each other and the channel sidewalls for preventing the escape of fluid from within the drain tube thus formed between the channel and the pressurized tubes, and a streamlined nozzle extending outwardly from said headstock and into sliding and sealing engagement between said pressurized tubes for conducting fluid out of the headstock and into said drain tube at all vertical adjustments of the headstock on the column whereby the fluid flows from the headstock into the reservoir without leakage from the drain device.

7. A lubricant-coolant fluid drain device for use on a machine tool having a horizontally disposed base, an upright column on the base, a spindle headstock supported on the column for vertical adjustment and a fluid circulating system including a fluid reservoir located in the base, and a pump for continuously pumping the fluid from the reservoir into the headstock, said fluid drain device comprising, in combination, an outwardly opening channel extending the length of the column and having its lower end opening into the reservoir in the base, a pair of resilient tubes extending along the open side of said channel and diametrically disposed between the channel sidewalls, means for pressurizing said tubes so that they sealingly abut each other and the channel sidewalls for preventing the escape of fluid from within the drain tube thus formed between the channel and the pressurized tubes, and a streamlined nozzle extending outwardly from said headstock and into sliding and sealing engagement between said tubes for conducting fluid out of the headstock and into said drain tube at all vertical adjustments of the headstock on the column, said nozzle being substantially diamond-shaped in cross section and having peripheral shoulder surfaces for sealingly engaging said pressurized tubes whereby the fluid flows from the headstock into the reservoir without leakage thereof from the drain device.

8. A lubricant-coolant fluid drain device for use on a machine tool having a horizontally disposed base, an upright column on the base, a spindle headstock supported on the column for vertical adjustment, and a fluid circulating system including a fluid reservoir located in the base, and a pump for continuously pumping the fluid from the reservoir into the headstock, said fluid drain device comprising, in combination, an outwardly opening channel extending the length of the column and having its lower end opening into the reservoir in the base, means yieldably sealing the open side of said channel to prevent the escape of fluid therefrom, a splash screen on the inner web surface of said channel, and a nozzle extending outwardly from said headstock and into sliding and sealing engagement with said yieldable sealing means on said channel for conducting fluid out of the headstock and into said channel and against said splash screen at all vertical adjustments of the headstock on the column whereby the fluid flows from the headstock into the reservoir without leakage.

9. In a machine tool, the combination comprising a base, a headstock supported on said base for movement relative thereto, a lubricating system for said headstock including a lubricant reservoir located in said base and a pump for pumping said lubricant from said reservoir into said headstock, a drain tube extending along said base in the direction of movement of said headstock and opening into said reservoir, said drain tube comprising an outwardly opening channel and means yieldably sealing the open side of said channel to prevent the escape of lubricant therefrom, and a nozzle extending outwardly from said headstock and slidably and sealingly engaging said yieldable sealing means for conducting lubricant from said headstock into said drain tube from which it flows back into said reservoir.

10. In a machine tool, the combination comprising a base, an upright column on said base, a spindle headstock supported on said column for vertical adjustment, a lubricating system for said headstock including a lubricant reservoir located in said base and a pump for pumping said lubricant from said reservoir into said headstock, an outwardly opening channel extending the length of said column and having its lower end opening into said reservoir, a pair of pressurized tubes extending along the open side of said channel, said pressurized tubes sealingly abutting each other and the channel sidewalls for preventing the escape of lubricant from within the drain tube thus formed between the channel and the pressurized tubes, and a streamlined nozzle extending from said headstock and into sliding and sealing engagement between said pressurized tubes for conducting lubricant from said headstock and into said drain tube from which it flows into said reservoir.

References Cited in the file of this patent
UNITED STATES PATENTS
2,762,269     Gallimore _____ Sept. 11, 1956